No. 820,479. PATENTED MAY 15, 1906.
J. H. CROSKEY.
APPARATUS FOR MANUFACTURING GLASS ARTICLES.
APPLICATION FILED MAY 10, 1905.

2 SHEETS—SHEET 1.

Witnesses:
E. R. Rodd.
Chas. S. Lipley

Inventor:
John H. Croskey
by O. M. Clarke
his Attorney

No. 820,479. PATENTED MAY 15, 1906.
J. H. CROSKEY.
APPARATUS FOR MANUFACTURING GLASS ARTICLES.
APPLICATION FILED MAY 10, 1905.
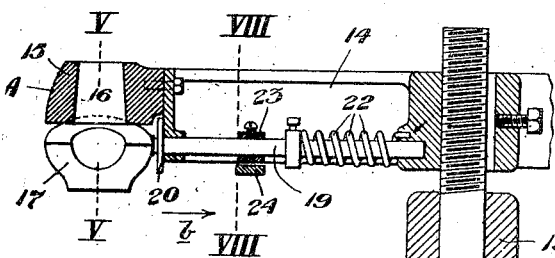
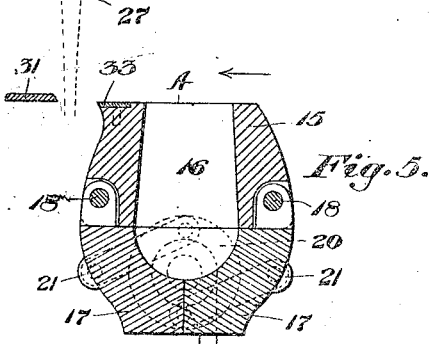
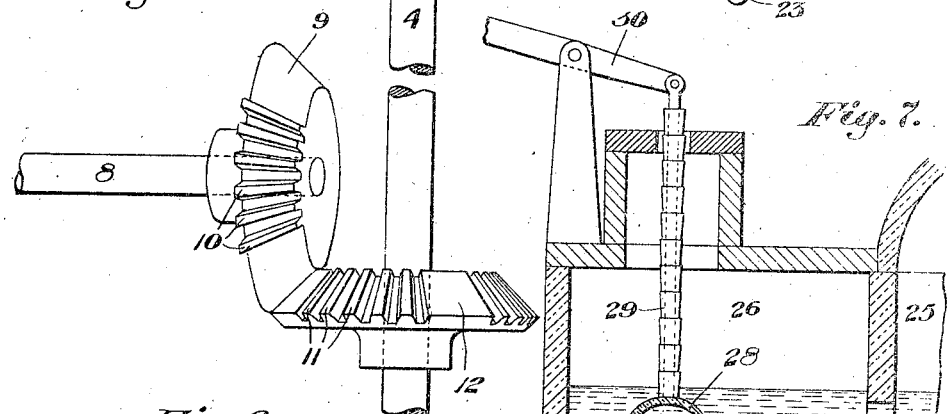
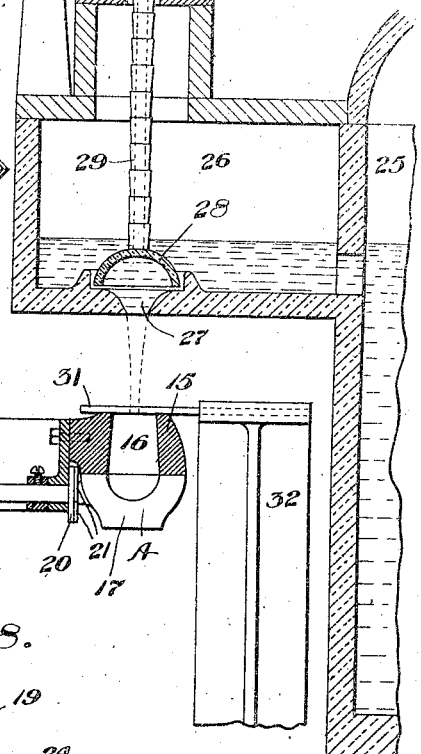
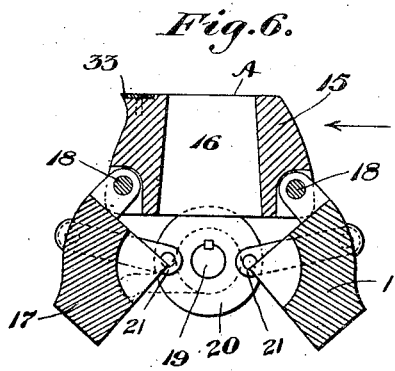
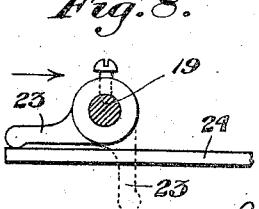

UNITED STATES PATENT OFFICE.

JOHN H. CROSKEY, OF PITTSBURG, PENNSYLVANIA, ASSIGNOR TO DUQUESNE GLASS COMPANY, OF PITTSBURG, PENNSYLVANIA, A CORPORATION OF PENNSYLVANIA.

APPARATUS FOR MANUFACTURING GLASS ARTICLES.

No. 820,479.   Specification of Letters Patent.   Patented May 15, 1906.

Application filed May 10, 1905. Serial No. 259,754.

*To all whom it may concern:*

Be it known that I, JOHN H. CROSKEY, a citizen of the United States, residing at Pittsburg, in the county of Allegheny and State of Pennsylvania, have invented certain new and useful Improvements in Apparatus for Manufacturing Glass Articles, of which the following is a specification, reference being had therein to the accompanying drawings, forming part of the specification, in which—

Figure 1:
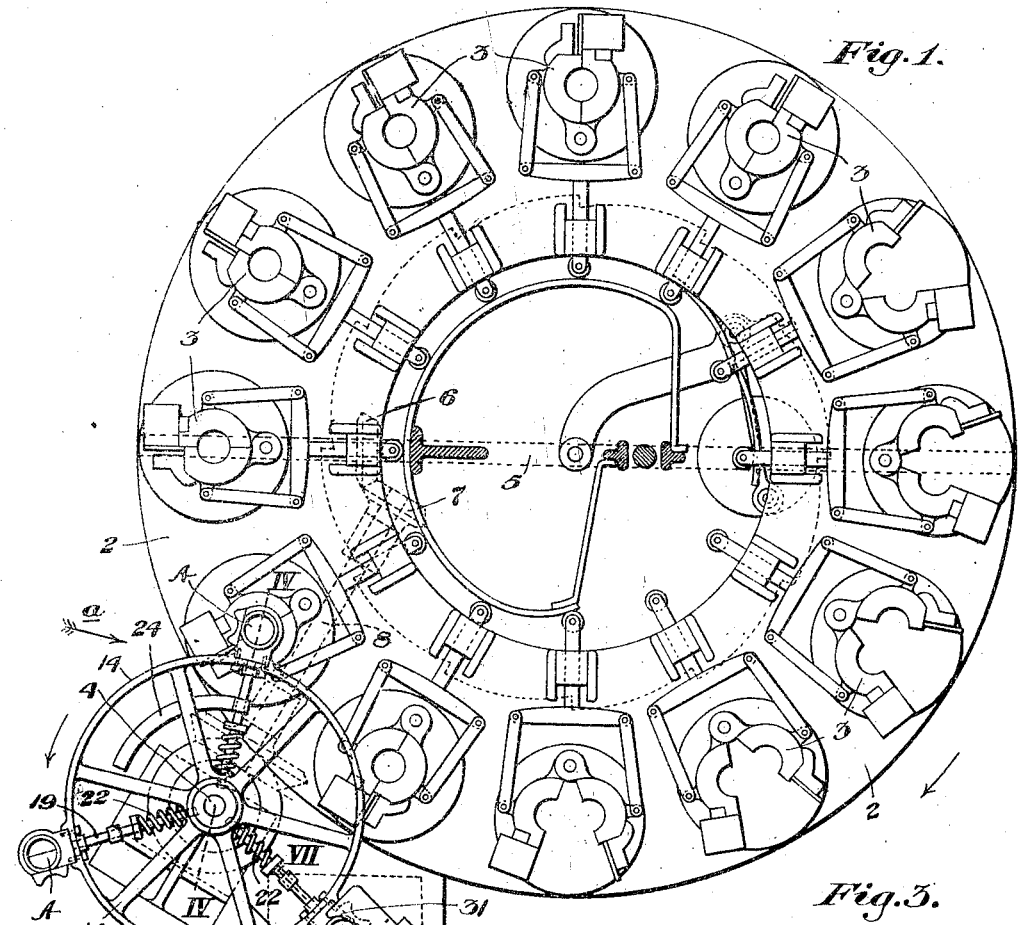
Figure 2:
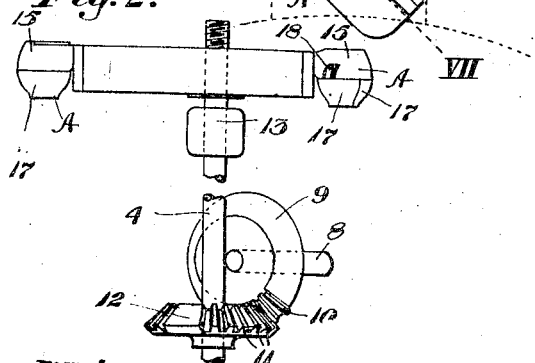
Figure 3:
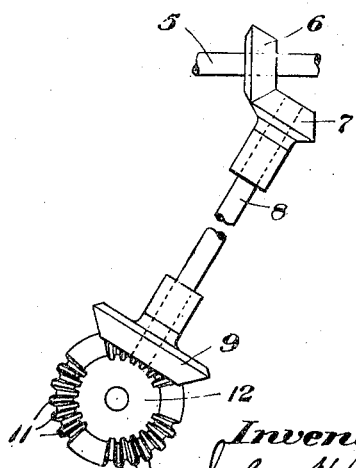

Figure 1 is a plan view of an apparatus for forming articles of plastic material provided with my improved measuring and filling apparatus. Fig. 2 is a front elevation of the measuring and filling apparatus. Fig. 3 is a plan view of the driving-gearing. Fig. 4 is a vertical sectional view on the line IV IV of Fig. 1 looking in the direction of the arrow *a*. Fig. 5 is an enlarged vertical cross-section through the measuring-cup on the line V V of Fig. 4, the cup being closed. Fig. 6 is a similar view, the cup being open and arranged over one of the molds. Fig. 7 is a vertical sectional view on the line VII VII of Fig. 1 and showing the cup in filling position beneath the tank-chamber extension. Fig. 8 is a detail sectional view on the line VIII VIII of Fig. 4 looking in the direction of arrow *b*.

My invention refers to means for charging a measured quantity of glass into the molds of a glass-pressing apparatus; and it consists of a divided cup adapted to be brought into register with the delivery-opening of a supply tank or stream and to receive a content thereof, to shear off any surplus glass, and to finally open automatically over the mold and to discharge the contents thereinto, as shall be more fully hereinafter set forth.

The invention is designed to operate in conjunction with any suitable glass-pressing mechanism, preferably that class wherein a series of molds are carried upon a rotating circular table, and I have shown it so arranged to operate with such an apparatus as is shown and described in my prior application, filed June 10, 1904, bearing the serial number 211,904.

Referring now to the drawings, 2 represents the carrying-table provided with an annular series of molds 3, mounted upon the table, adapted to be opened and closed at the proper time and to be carried around intermittently to bring the molds into register with the filling mechanism and with the plunger, and finally to the position where the finished article is discharged from the mold, each mold successively occupying corresponding progressive positions. The turn-table 2 is intermittently actuated by any suitable mechanism, such as is shown in my prior application above referred to, and the charging apparatus (the subject of the present invention) is so located as to be in operative proximity with each one of a series of molds as it comes into position and also in such relation with the delivery-opening of a glass-melting tank or pot adapted to deliver the molten glass into the cups as they are successively brought into register with said opening.

4 represents a vertical rotating spindle intermittently actuated from the main shaft 5 through constantly-running bevel-gears 6 7, shaft 8 being provided with a mutilated bevel-gear 9, provided with a series of segmental teeth 10, adapted to intermesh with corresponding series of segmental teeth 11 of similar gear 12, mounted upon shaft 4. The operative teeth of these mutilated gears are so arranged that a partial revolution will be imparted to shaft 4 corresponding with the desired period of rotation of a series of carrying-cups mounted in the upper portion, and it will be understood that I do not desire to be limited to any specific number of cups, as three, but that these may be varied, a corresponding variation being made in the driving-gearing, the only essential being that the cup shall be quickly moved from the receiving position to the discharge position and that it will be temporarily stationed at each position. Upon the upper portion of spindle 4, which is mounted in suitable guiding-bearings 13, is secured a spider-frame 14 of any suitable construction, as a wheel, at equidistant portions whereof around its periphery are located measuring-cups A. These cups consist of an upper stationary portion 15, rigidly secured to the frame 14, provided with an interior cavity 16, preferably flaring somewhat downwardly, as shown, while the bottom portion of the cup is composed of two oppositely-located divided sections 17 17, hinged to the upper portion 15 at 18 by means of suitable hinge projections and adapted when closed to form a complete receiving-cup, as shown in Fig. 5, of the desired capacity, so that when the cup is filled flush with its top it will contain just sufficient glass to form the article designed to be pressed in each mold 3. The divided halves 17, forming the lower portion of the cup, are normally maintained closed by means of a shaft 19, having a crank-disk 20, to which are attached the connecting-pitmen 21 21, the shaft being provided with a stiff coiled spring 22, adapted to normally turn it in the proper direction as to exert closing pressure upon the cup-halves, and it will be understood that the same result may be effected by a suitable counterweighted arm.

For the purpose of opening the divided halves 17 on their hinges shaft 19 is provided with a normally downwardly extending arm 23, secured to the shaft in any convenient position and arranged to come into contact with an abutment 24, located in such a position, as shown in Fig. 1, that when the cup has been swung around into registering position with the mold the arm 23 will have engaged abutment 24, so as to throw the divided bottom open, as shown in Fig. 6, thereby delivering the charge of glass downwardly into mold 3. The abutment 24 may be extended, if desired, forming a flat floor-surface for arm 23, so that the cup may be maintained opened for a portion of the inoperative travel around with the wheel 14, facilitating cooling of the cup and the final discharge of any adhering particles of glass.

The cup is charged with molten glass in its stationary position before registering with mold 2 from a glass-tank 25, provided with an outwardly-extended portion of the tank inclosing a chamber 26, or a spout under which the cup is swung into register with an outlet-opening 27, a vertically-adjustable valve or gate 28 being employed, so as to regulate the flow of the glass. This gate 28 may be of any suitable form adapted for the purpose and is secured upon the lower end of a supporting-stem provided with refractory protecting-rings 29, extending upwardly through the covering of the glass-chamber and provided with a lever 30 or other suitable actuating means.

31 is a knife-blade mounted in a suitable standard 32, projecting outwardly adjacent to the stream of glass, while the cup 15 is provided with a knife-edge 33, adapted to shear off the lower depending part of the glass, as shown in Fig. 5, immediately before the cup is brought into registering position therewith, thus insuring a fresh supply of molten metal. The glass then continues to flow into the cup, filling it, and upon further travel, as the cup is swung around to the discharge position, knife 31, acting upon the horizontal top of the cup, will cleanly shear off any surplus glass, thereby insuring an exact measured quantity, which is then delivered into the glass-pressing mold, as has been described. It will be understood also that the cups may be filled by any other means, as by gathering punty in the usual way, the operation otherwise being as has been stated.

The operation of opening the cup may be secured by different means from that shown and the mechanism may be changed or varied in different details of construction by the skilled mechanic; but all such changes are to be considered as within the scope of the following claims.

What I claim is—

1. Apparatus for charging a measured quantity of glass into a mold consisting of an open-top cup provided with a hinged bottom portion adapted to lower downwardly and outwardly away from the contents, and means for opening and closing said bottom portion, substantially as set forth.

2. Apparatus for charging a measured quantity of glass into a mold consisting of an open-top cup provided with a hinged bottom portion, means for opening and closing said bottom portion, and means for shearing off the surplus glass from the top of the cup, substantially as set forth.

3. The combination with a swinging frame, of an open-top cup provided with a hinged bottom portion, a crank-shaft provided with connections to said hinged bottom portion, with means for intermittently partially rotating said crank-shaft to open the bottom, substantially as set forth.

4. The combination with a swinging frame, of an open-top cup provided with a hinged bottom portion, a crank-shaft provided with connections to said hinged bottom portion, with means for intermittently partially rotating said crank-shaft to open the bottom, and means for automatically reversing the movement of said shaft to close the bottom, substantially as set forth.

5. The combination with a traveling intermittently-stationary mold, of a swinging frame carrying an open-top measuring-cup provided with a hinged bottom portion, means for rotating said framework to position the cup beneath a glass-supply opening and over the mold respectively, means for shearing off the surplus glass, and means for opening the hinged bottom portion of the cup, substantially as set forth.

6. The combination with a traveling intermittently-stationary mold, of a swinging frame carrying an open-top measuring-cup provided with a hinged bottom portion, means for rotating said framework to position the cup beneath a glass-supply opening and over the mold respectively, means for shearing off the surplus glass, and means for opening the hinged bottom portion of the cup, with gearing in engagement with the driving mechanism of the mold adapted to intermittently actuate said measuring mechanism in conformity with the movement thereof, substantially as set forth.

7. The combination with a stationary shearing-blade located adjacent to the supply-opening of a glass-tank, of a laterally-traveling open-top measuring-cup having a hinged bottom and adapted to travel underneath said blade to shear off the surplus glass, substantially as set forth.

8. The combination with a stationary shearing-blade located adjacent to the supply-opening of a glass-tank, of a laterally-traveling open-top measuring-cup adapted to travel underneath said blade to shear off the surplus glass, said cup being provided with a hinged bottom portion, and means for opening and closing said bottom portion, substantially as set forth.

In testimony whereof I affix my signature in presence of two witnesses.

JOHN H. CROSKEY.

Witnesses:
CHAS. S. LEPLEY,
C. M. CLARKE.